IMAGE ORTHICON TUBES

Filed Sept. 15, 1967

INVENTORS.
CHESTER L. HEFLIN
ARTHUR H. MENGEL
BY
ATTORNEY 3,520,995
Patented July 21, 1970

3,520,995

IMAGE ORTHICON TUBES

Chester L. Heflin, Schwenksville, and Arthur H. Mengel, Laureldale, Pa. (both % Teltron, Inc., Box 131, Boyertown, Pa. 19512)

Filed Sept. 15, 1967, Ser. No. 668,087
Int. Cl. H04n 5/34
U.S. Cl. 178—7.2 5 Claims

ABSTRACT OF THE DISCLOSURE

Image orthicon television tubes having circuitry which provides automatic compensation for changes in the current strength of the scanning beam to a constant value thereby reducing noise levels and improving tube performance. The circuitry involves a departure from prior circuitry and includes removing the cathode from ground potential and connecting it through a resistor to the electron emission cathode grid control voltage whereby the target will be bombarded evenly with no oversaturation throughout low to high light level operation.

BACKGROUND OF THE INVENTION

Field of the invention

This invention relates to an image orthicon tube having improved circuitry so as to compensate for scanning beam current variation.

Description of the prior art

The operation of image orthicon tubes requires an ability to reproduce the image over a wide range of illumination and distance. This necessitates a strong scanning beam to reproduce the image on the target at high light levels but not so strong that the target is overdriven at low light levels. The previously available circuits have largely ignored low level operation and attendant noise which is present in the tubes with these circuits, in order to have efficient high level operation. The present invention reduces low level noise, provides a constant controlled beam current output and is suitable for all levels of operation.

SUMMARY OF THE INVENTION

The principal object of the present invention is to provide an image orthicon tube having circuitry for automatic beam compensation whereby the magnitude of scanning beam current is kept constant thereby reducing random fluctuation and consequent noise.

A further object of the present invention is to provide an image orthicon tube having automatic beam compensation whereby the target is adequately discharged at both high and low light levels.

A further object of the present invention is to provide an image orthicon tube having automatic beam compensation whereby it is impossible to overdrive the target with excess beam current thereby reducing target degradation and increasing the target life.

A further object of the present invention is to provide an image orthicon tube having automatic beam compensation whereby lateral leakage causing black noise is minimized.

A further object of the present invention is to provide an image orthicon tube having automatic beam compensation whereby the scanning beam maintains a constant relationship with the target which results in the scanning beam attaining a more orthogonal landing on the target.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
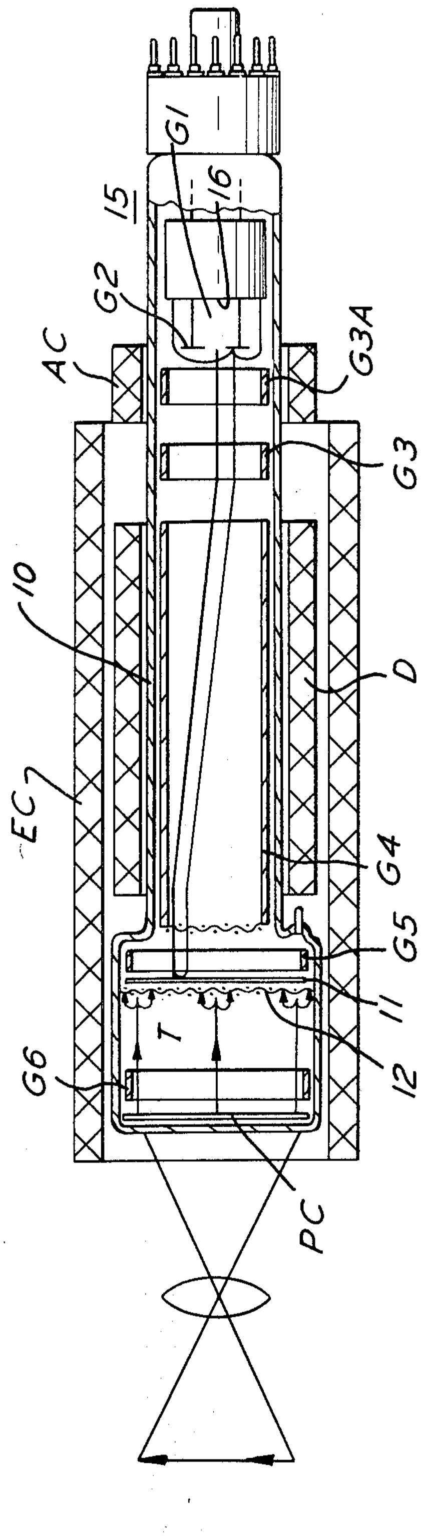
FIG. 1 is a longitudinal sectional view of a representative image orthicon tube in accordance with the invention and illustrating its components parts.
Figure 2:
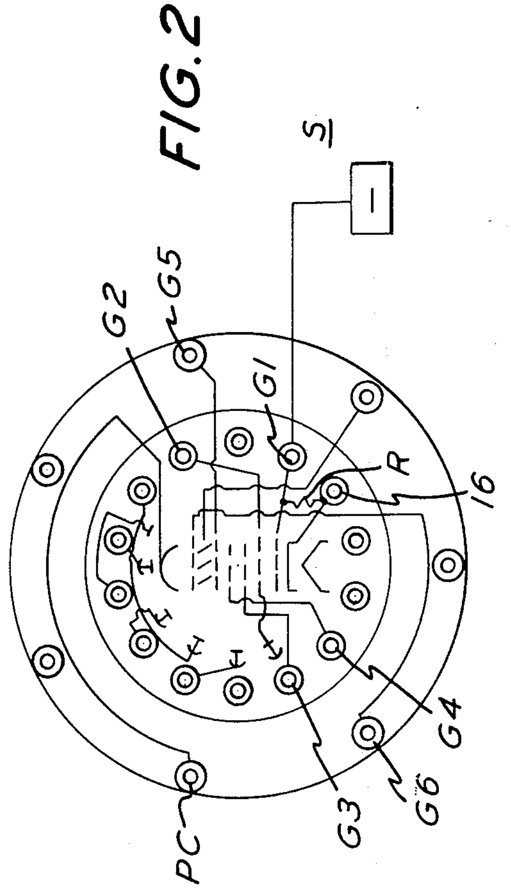
FIG. 2 is an end view, enlarged, showing the socket portion of the tube of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings an image orthicon tube is there illustrated in accordance with the invention having an image section, a scanning section, a multiplier section all enclosed in a glass envelope 10.

The image section contains a semi-transparent photocathode PC on the inside of the faceplate, a grid G6 to provide an electrostatic accelerating field, and a target T which consists of a thin glass disc 11 with a fine mesh wire screen 12 in closely spaced relation on the photocathode side. Focusing is accomplished by means of a magnetic field produced by an external coil EC and by varying the photocathode voltage in a well known manner.

A light image focused onto the photocathode PC by an appropriate and if desired conventional optical system (not shown) will be translated into an electron image which in turn is directed toward the target T by the combined electrostatic and electromagnetic focusing system described above. The photoelectrons from the photo-cathode PC are emitted in direct proportion to the light intensity which has been reflected onto the photocathode PC from various parts of the scene, and by reason of the electrostatic-magnetic focusing grids G6 and coil EC the electrons approach the target in array unchanged from that on the photocathode PC. The electrons leaving the photocathode PC have a large range of velocities varying substantially in speed and direction, requiring a magnetic focusing field to swing these off-axis electrons into a helical beam. Proper focusing is achieved when the photocathode voltage is adjusted so that the individual electrons will exactly achieve one complete helix and come back to the same angular position as the electrons travel from photocathode PC to target T.

When electrons are accelerated so as to bombard a target of insulating material here a thin glass disc 11, secondary electrons are excited at the surface of the disc 11. As the accelerating voltage of the primary electrons is increased, a voltage is reached such that the number of secondary electrons leaving the disc 11 is exactly equal to the number of primary electrons arriving at it. At this particular value of voltage, the ratio of primary to secondary electrons is equal to unity, and the potential at which this occurs is called the first crossover potential. When the electrons are accelerated towards the disc 11 by potentials which are under the first crossover potential, the disc 11 will tend to be negative until it reaches an equilibrium potential, which is approximately equal to cathode potential. Once it has come to this equilibrium potential, no further electrons can reach the disc 11 since the electrons leaving the photocathode PC would be moving against a retarding electric field. Similar considerations show that if disc 11 is bombarded above the first crossover potential, that is, under circumstances where more electrons leave the disc 11 than come to it, the disc 11 will become more positive. The equilibrium potential, that is, the final potential which the disc 11 should reach, will in this case be at collector potential. Collector potential is the potential of the positive element in the tube to which secondary electrons are attracted. The disc 11 cannot reach any value higher than the collector potential since electrons from the target disc 11 would have to travel against a retarding field to reach the collector under these conditions and would return to the target T, with a velocity less than the crossover, thereby driving the target negative until equilibrium is reached. Velocity of the secondaries are ignored in these considerations.

Therefore, in accordance with the above basic principles of secondary emission, it can be seen that if electrons leaving the photocathode PC are energized above the crossover potential, as they approach the target T, the photocathode side of the target T will be charged positively by signal information from the photocathode PC.

The target structure and specifically the disc 11 is scanned by an electron scanning beam from the scanning section which is fully described below and if the scanning beam is kept below first crossover potential, it will tend to charge any element of the target T being scanned toward photocathode potential.

The target structure above described has the advantage of storage. Information coming from a raster element on the photocathode PC is written on the disc 11 of the target T by the electrons from photocathode PC continually during frame time. Thus, the voltage on the target section corresponding to a scene element of information builds up continuously during frame time even though this information is used for only a fraction of a microsecond during the scanning operation. It has been noted that some amplification occurs at the target T due to the high secondary emission ratio of the writing side of the target. Thus for each writing electron that lands in the writing of the image, of the order of 5 electrons are effective in writing information on the target T.

The image is written by photo-electrons on the writing side of the disc 11. The voltage of this side increases in proportion to the intensity of the image. At the same time, the potential of corresponding elements on the reading side of the disc 11 increases to a corresponding potential by conduction through the glass disc 11. This is the potential seen by the beam during scanning. Since this potential is now positive relative to the target equilibrium potential, scanning beam electrons are now able to land. The number of electrons subtracted from the scanning beam essentially constitutes the video signal. When the scanning side of the disc 11 is brought to cathode potential during scanning, the writing side of the disc 11 is capacity coupled to the mesh 12, therefore it will not drop all the way down to the equilibrium potential as is desired. For this reason it is necessary that the glass disc 11 of the target have sufficient conductivity to permit current flow to take place to bring both sides of the disc 11 to the same potential within frame time. On the other hand the disc 11 may not be made too conducting to prevent leakage of information laterally, as this results in deterioration of image sharpness.

The scanning section of the tube consists essentially of an electron gun 15 producing a very fine beam and a focusing system which is made up of electrodes (not shown), grids G2, G3, G4, and a decelerating grid G5. The amount of beam current being used to scan the glass disc 11 of target T is controlled by grid G1 adjacent to the thermionic cathode 16 of the electron gun 15. The beam is aligned with respect to the target T by use of a transverse magnetic field produced by an alignment coil AC and a horizontal and vertical coil D. Proper focusing of the beam as it scans the target is accomplished by use of the alignment coil AC, the suppressor grids G3 and G3A and the magnetic focusing coil D. The beam as it leaves the gun section has been brought to the desired velocity say to a 300 volt velocity. Its speed is then reduced by decelerator electrode grid G5 which is designed to insure orthogonal landing on disc 11. The beam just comes to zero velocity as it approaches the disc 11 of the target T. That portion of the beam which is not used to bring areas of the disc 11 having signal information to zero potential is reflected by the focusing arrangements and brought back to a dynode #1 (not shown).

The focusing arrangement of the tube is such that dynode #1 (not shown) is scanned during normal scanning of the target T. The potentials of grids G3, G3A and G4 are adjusted to minimize dynode #1 (not shown) pattern imperfections yet keep the image in proper form. Noise, that is random fluctuations in an electron beam such as the scanning beam of the image orthicon is proportional to the square root of the current magnitude. For modes of operation of the tube which involve low light levels it is possible for beam noise to become large relative to the signal. For this reason, for low level operation it is desirable to decrease beam current magnitude to get optimum signal from the standpoint of low noise while maintaining the ability to adequately discharge the image on the disc 11.

In order to decrease the beam current and maintain it constant for a wide range of grid G1 voltage levels while remaining at a level that will bring the target to zero potential at various light levels it is necessary to remove the thermionic cathode 16 from the ground potential. A resistance R of fixed value is inserted between the thermionic cathode 16 connection to the grid G1 connection, which is also connected to the grid G1 minus control voltage source S. As the grid G1 minus control voltage is lowered to a point where electrons are emitted from the thermionic cathode 16 current begins to flow in the grid G1 and cathode resistor from the minus control voltage. Current flow in the resistor R sets up a positive potential on the thermionic cathode 16, in direct proportion to the current flow. Additional current flow will bring the thermionic cathode 16 to a more positive potential in respect to the grid G1 reducing the electron emission from the thermionic cathode 16. When the cathode 16 is minus in respect to the disc 11 of target T electrons will land on the target T enabling the pattern to be discharged. Additional current flow making the thermionic cathode 16 more positive than the target T will result in no landing or target cutoff. Oversaturation of the target T from the scanning beam is impossible under these conditions.

It will thus be seen that structure has been provided to attain the objects of the invention.

We claim:

1. An image orthicon tube having an envelope containing
- an image section,
- a scanning section within a current controlled electron gun having a thermionic cathode and a multiplier section,
- said thermionic cathode having a control grid and an input to said cathode,
- means for connecting said control grid to a source of negative potential, and
- means for compensating for variations in the current input to said cathode in the range from low light level energization to high light level energization of the image section,
- said last mentioned means being interposed between said cathode and said control grid.

2. An image orthicon tube as defined in claim 1 in which said last mentioned means comprises a resistance.

3. An image orthicon tube as defined in claim 2 in which said resistance is a fixed resistance.

4. An image orthicon tube as defined in claim 2 in which said resistance is connected in series between said cathode and said control grid.

5. An image orthicon tube as defined in claim 2 in which said current input is directly connected to said control grid and is connected to said cathode through said resistance.

References Cited

UNITED STATES PATENTS 2,911,562 11/1959 Fathauer.

OTHER REFERENCES

Electronic Circuits and Tubes, Cruft Electronics Staff, First Edition, McGraw-Hill Book Co. Inc., New York, N.Y., copyright 1947, TK 7815 H3 C. 3 (pp. 490–491 relied on).

RICHARD MURRAY, Primary Examiner

A. H. EDDLEMAN, Assistant Examiner